United States Patent
Kamioka et al.

(10) Patent No.: US 10,281,273 B2
(45) Date of Patent: May 7, 2019

(54) SENSING SYSTEM AND SENSING METHOD

(71) Applicant: HONDA MOTOR CO., LTD., Tokyo (JP)

(72) Inventors: Takumi Kamioka, Saitama (JP); Kenta Tanaka, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 365 days.

(21) Appl. No.: 15/274,112

(22) Filed: Sep. 23, 2016

(65) Prior Publication Data

US 2017/0184397 A1 Jun. 29, 2017

(30) Foreign Application Priority Data

Dec. 24, 2015 (JP) ................................. 2015-252337

(51) Int. Cl.
| | | |
|---|---|---|
| *G01C 3/00* | (2006.01) | |
| *H02P 8/08* | (2006.01) | |
| *H02P 8/14* | (2006.01) | |
| *H02P 8/20* | (2006.01) | |
| *G01S 7/481* | (2006.01) | |
| *G01C 3/08* | (2006.01) | |
| *G01S 17/42* | (2006.01) | |

(Continued)

(52) U.S. Cl.
CPC ............... *G01C 3/08* (2013.01); *G01S 7/497* (2013.01); *G01S 17/42* (2013.01); *G01S 7/4817* (2013.01); *H02P 8/00* (2013.01); *H02P 8/14* (2013.01); *H02P 8/20* (2013.01)

(58) Field of Classification Search
CPC ..... G01C 3/08; H02P 8/00; H02P 8/14; H02P 8/20; G01S 7/4817
See application file for complete search history.

(56) References Cited

U.S. PATENT DOCUMENTS 6,407,527 B1 * 6/2002 Misumi .................. G05B 19/40
  318/685
9,285,477 B1 * 3/2016 Smith ..................... G01S 17/89
(Continued)

FOREIGN PATENT DOCUMENTS

| JP | 02-197813 A | 8/1990 |
|---|---|---|
| JP | H07-98381 | 4/1995 |

(Continued)

OTHER PUBLICATIONS

Japanese Office Action dated Oct. 23, 2018, 3 pages.
Japanese Office Action dated Feb. 26, 2019, 4 pages.

*Primary Examiner* — Eric L Bolda
(74) *Attorney, Agent, or Firm* — Rankin, Hill & Clark LLP

(57) ABSTRACT

Provided is a sensing system (1) in which a desired trajectory determining section (32) determines a first desired trajectory th(t) (where t<t1) whose first derivative is continuous, a second desired trajectory th(t) (where t2≤t<t3) whose first derivative is continuous, a third desired trajectory th(t) (where t1≤t<t2) configured with a common tangent line to the first and second desired trajectories, and a fourth desired trajectory th(t) (where t3≤t<t4) configured with a common tangent line to the second desired trajectory in the current-time cycle and a first desired trajectory in a next-time cycle. A drive mechanism controlling section (33) controls an operation of the drive mechanism so as to track the desired trajectories.

4 Claims, 8 Drawing Sheets

(51) Int. Cl.
*G01S 7/497* (2006.01)
*H02P 8/00* (2006.01)

(56) References Cited

U.S. PATENT DOCUMENTS

| | | | | |
|---|---|---|---|---|
| 2010/0053715 | A1* | 3/2010 | O'Neill | G01S 7/4817 359/199.3 |
| 2012/0236379 | A1* | 9/2012 | da Silva | G01S 7/4817 359/200.8 |
| 2014/0063489 | A1* | 3/2014 | Steffey | G01S 17/023 356/72 |
| 2017/0261939 | A1* | 9/2017 | Hosobuchi | H02P 29/60 |

FOREIGN PATENT DOCUMENTS

| | | |
|---|---|---|
| JP | H09-304535 | 11/1997 |
| JP | 2007-225434 | 9/2007 |
| JP | 2008-020370 A | 1/2008 |

* cited by examiner

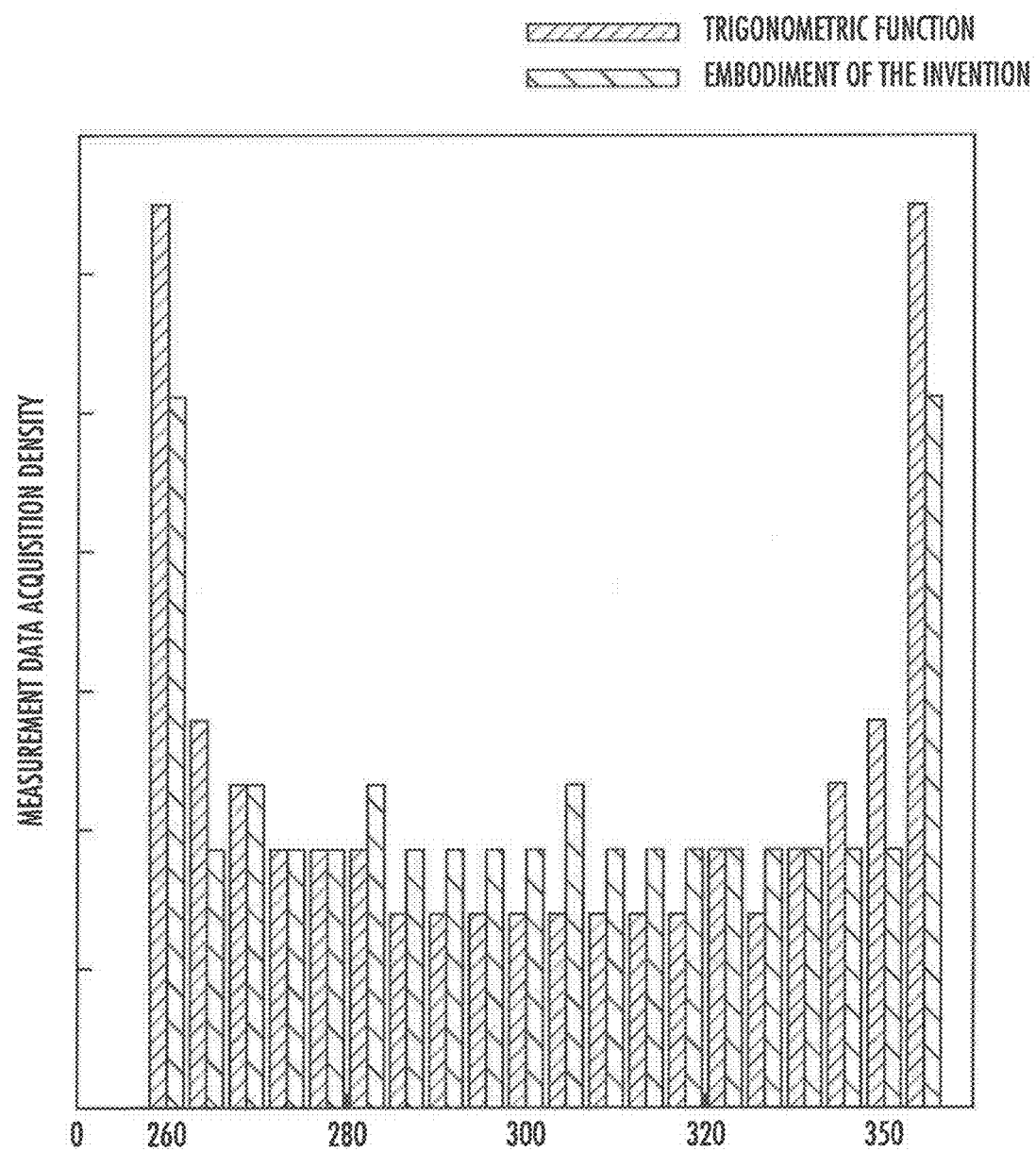

r=1.5, a=3.1416, T=10 r=1.5, a=3.1416, T=10 r=2.5, a=3.1416, T=10 r=2.5, a=3.1416, T=10

SENSING SYSTEM AND SENSING METHOD

BACKGROUND OF THE INVENTION

Field of the Invention

The present invention relates to a sensing system and a sensing method that use a sensor constituted to be rotatable.

Description of the Related Art

Sensing systems that recognize a surrounding environment using a sensor constituted to be rotatable are conventionally known.

For example, as a type of such sensing systems, a three-dimensional measuring device that causes a CCD camera as a sensor to rotate in yaw and pitch directions and recognizes an object to be measured from image data picked up by the CCD camera has been proposed in Japanese Patent Application Laid-Open No. 2007-225434.

SUMMARY OF THE INVENTION

In the case of performing three-dimensional measurement using a sensor such as a camera or a laser range finder (LRF), it is desirable for the sensor data to be acquired with constant density. If the frequency of sensing by the sensor is constant, the sensor data acquisition density may be made constant by keeping the moving angular velocity of the sensor constant.

When the movable angle range of the sensor is limited, however, the moving direction of the sensor needs to be switched at a limit of the sensor movable range, in accordance with a desired trajectory of the sensor shown in FIG. 8A, for example. In this control, the moving angular velocity of the sensor becomes discontinuous at the time point tm at which the moving direction is switched, as shown in FIG. 8B. At this time point tm, a drive mechanism responsible for moving the sensor may exceed the limit of its performance, or a considerable load may be applied to the drive mechanism.

As a way of avoiding such switching that would apply a certain load to the drive mechanism, it may be conceivable to control the rotational movement of the sensor in accordance with a desired trajectory of the sensor, shown in FIG. 8C, which is expressed by a trigonometric function. With this control, however, the moving angular velocity of the sensor is not constant, as shown in FIG. 8D, making it difficult to keep the sensor data acquisition density constant.

In view of the foregoing problems, it is an object of the present invention to provide a sensing system and a sensing method that can reduce or eliminate a load on a drive mechanism that rotationally moves a sensor, while keeping the sensor data acquisition density constant in at least some periods.

A sensing system according to the present invention includes:

a sensor configured to acquire information about surrounding space at a fixed time interval;

a drive mechanism which causes a reference axis of the sensor to swing about an axis in a range not smaller than a first angle and not larger than a second angle in a drive mechanism coordinate system;

a desired trajectory determining section which is operable, in a case where a current-time cycle for the reference axis of the sensor to make one swing is divided into a first period, including a time point at which an angle of the reference axis of the sensor becomes the first angle, the time point not falling on a beginning or an end of the first period, a second period, including a time point at which an angle of the reference axis of the sensor becomes the second angle, the time point not falling on a beginning or an end of the second period, a first intermediate period, being a period between the first period and the second period, and a second intermediate period, being a period between the second period and a first period in a next-time cycle, to determine a first desired trajectory representing a time series of angle of the reference axis of the sensor in the first period in the current-time cycle, a first derivative with respect to time of the first desired trajectory being continuous in the first period in the current-time cycle, a second desired trajectory representing a time series of angle of the reference axis of the sensor in the second period in the current-time cycle, a first derivative with respect to time of the second desired trajectory being continuous in the second period in the current-time cycle, a slope of a tangent line to the second desired trajectory at a beginning of the second period in the current-time cycle being identical to a slope of a tangent line to the first desired trajectory at an end of the first period in the current-time cycle, a slope of a tangent line to the second desired trajectory at an end of the second period in the current-time cycle being identical to a slope of a tangent line to the first desired trajectory at a beginning of the first period in the next-time cycle, a third desired trajectory representing a time series of angle of the reference axis of the sensor in the first intermediate period in the current-time cycle, the third desired trajectory being configured with the tangent line to the first desired trajectory at the end of the first period in the current-time cycle, and a fourth desired trajectory representing a time series of angle of the reference axis of the sensor in the second intermediate period in the current-time cycle, the fourth desired trajectory being configured with the tangent line to the second desired trajectory at the end of the second period in the current-time cycle; and a drive mechanism controlling section which controls an operation of the drive mechanism so as to track the desired trajectories determined by the desired trajectory determining section.

According to the sensing system of the present invention, the first desired trajectory and the second desired trajectory have their first derivatives with respect to time continuous in the corresponding periods. Consequently, the functions expressing the moving angular velocity of the sensor in the first period and in the second period of the current-time cycle both become continuous.

Further, the third desired trajectory is configured with the tangent line to the first desired trajectory at the end of the first period in the current-time cycle. The tangent line to the first desired trajectory at the end of the first period in the current-time cycle is identical to the tangent line to the second desired trajectory at the beginning of the second period in the current-time cycle. Accordingly, the moving angular velocity of the sensor is continuous in the first intermediate period in the current-time cycle, and at the transition timing from the first period in the current-time cycle to the first intermediate period in the current-time cycle and at the transition timing from the first intermediate period in the current-time cycle to the second period in the current-time cycle.

The fourth desired trajectory, likewise the third desired trajectory, is configured with the common tangent line to the second desired trajectory in the current-time cycle and the first desired trajectory in the next-time cycle. Accordingly, the moving angular velocity of the sensor is continuous in the second intermediate period in the current-time cycle, and at the transition timing from the second period in the current-time cycle to the second intermediate period in the current-time cycle and at the transition timing from the second intermediate period in the current-time cycle to the first period in the next-time cycle.

The moving angular velocity of the sensor thus becomes continuous in the respective periods, which reduces or eliminates the load on the drive mechanism.

Further, the third and fourth desired trajectories are configured with the tangent lines as described above, so the moving angular velocity of the sensor is constant in the first intermediate period in the current-time cycle and in the second intermediate period in the current-time cycle. Provided that the frequency of sensing is constant, the sensor data acquisition density becomes constant in the first intermediate period in the current-time cycle and in the second intermediate period in the current-time cycle.

As a result, according to the sensing system of the present invention, it is possible to reduce or eliminate the load on the drive mechanism that rotationally moves the sensor, while keeping the sensor data acquisition density constant in at least some periods.

In the sensing system of the present invention, it is preferable that the first desired trajectory is twice differentiable with respect to time at and around the time point at which the angle of the reference axis of the sensor becomes the first angle, and that the second desired trajectory is twice differentiable with respect to time at and around the time point at which the angle of the reference axis of the sensor becomes the second angle.

According to the sensing system with this configuration, the angular velocity of the sensor changes smoothly at and around the time point at which the angle of the reference axis of the sensor becomes the first or second angle. It is therefore possible to reduce the load on the drive mechanism at the time point at which the transition direction of the sensor is changed.

In the sensing system with this configuration, it is preferable that at least one of the first desired trajectory and the second desired trajectory is a trajectory expressed by a circle.

According to the sensing system with this configuration, at least one of the first desired trajectory and the second desired trajectory is expressed by a circle. This ensures smooth changes of the angular velocity of the sensor in the first period and the second period. It is therefore possible to reduce the load on the drive mechanism in the first and second periods.

BRIEF DESCRIPTION OF THE DRAWINGS

FIG. 4A to FIG. 4C are graphs in which FIG. 4A is a graph showing a relationship between an angle of a laser range finder and elapsed time, FIG. 4B is a graph showing a relationship between a moving angular velocity of the laser range finder and the elapsed time, and FIG. 4C is a graph showing a relationship between the angle of the laser range finder and elapsed time in the case of changing the cycle of movement of the laser range finder;

FIG. 5 is a graph showing the measurement data acquisition frequency (bars with left-up and right-down slanted stripes) of the sensing system and the measurement data acquisition frequency (bars with right-up and left-down slanted stripes) in the case of controlling the angle of a laser range finder in accordance with a trigonometric function, with the vertical axis representing the number of pieces of measurement data acquired and the horizontal axis representing the angle of each of the laser range finders:

FIG. 6A to FIG. 6D are graphs in which FIG. 6A is a graph showing a relationship between the angle of a laser range finder and elapsed time, the solid line graph representing the graph about the laser range finder of the sensing system, the broken line graph representing the graph about a laser range finder in the case of controlling the angle of the laser range finder in accordance with a trigonometric function, FIG. 6B is a graph showing, for each of the laser range finders in FIG. 6A, a relationship between the moving angular velocity of the laser range finder and the elapsed time corresponding to the time series of angle of the laser range finder, FIG. 6C is a graph showing a relationship between the angle of a laser range finder and elapsed time, the solid line graph representing the graph about a laser range finder in the case of generating a desired trajectory by setting a radius to exceed 0.5 times the angle range, the broken line graph representing the graph about a laser range finder in the case of controlling the angle of the laser range finder in accordance with a trigonometric function, and FIG. 6D is a graph showing, for each of the laser range finders in FIG. 6C, a relationship between the moving angular velocity of the laser range finder and the elapsed time corresponding to the time series of angle of the laser range finder:

FIG. 7A and FIG. 7B are top views in which FIG. 7A is a top view schematically showing the manner of irradiation of laser light by the sensing system and FIG. 7B is a top view schematically showing the manner of irradiation of laser light in the case of controlling the angle of the laser range finder in accordance with a trigonometric function; and FIG. 8A to FIG. 8D are graphs in which FIG. 8A is a graph showing a relationship between the angle of a laser range finder and elapsed time in the case of setting the moving angular velocity of the sensor constant, FIG. 8B is a graph showing a relationship between the angular velocity of the laser range finder and the elapsed time in the case of setting the moving angular velocity of the sensor constant, FIG. 8C is a graph showing a relationship between the angle of a laser range finder and elapsed time in the case of controlling the angle of the sensor in accordance with a trigonometric function, and FIG. 8D is a graph showing a relationship between the angular velocity of the laser range finder and the elapsed time in the case of controlling the angle of the sensor in accordance with the trigonometric function.

DESCRIPTION OF THE PREFERRED EMBODIMENTS

A sensing system 1 according to an embodiment of the present invention is mounted on a robot (not shown), and is configured to provide acquired sensor data to a control mechanism of the robot. Instead, the sensing system 1 may be mounted on a mobile body, such as a vehicle, or installed in a stationary object, such as a monitoring camera system in a building.

Figure 1:
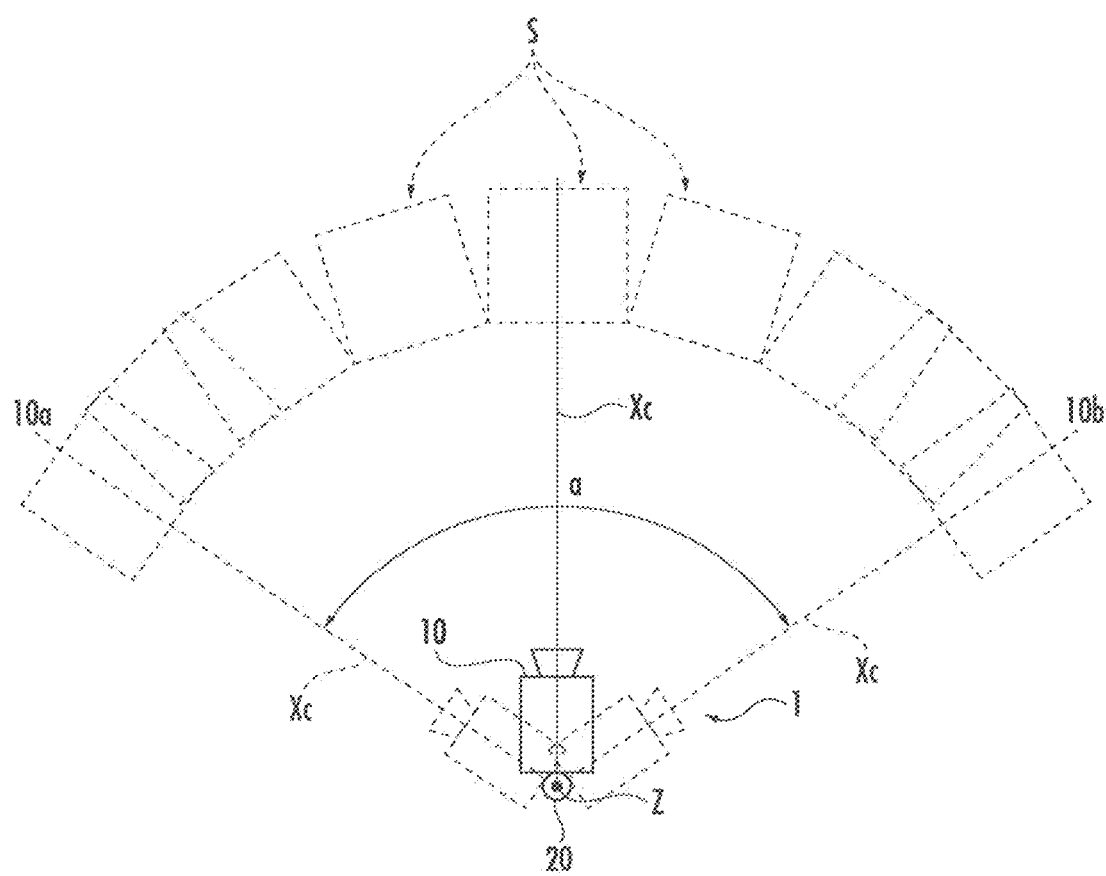
FIG. 1 is a top plan view showing a state of use of a sensing system.
Figure 2:
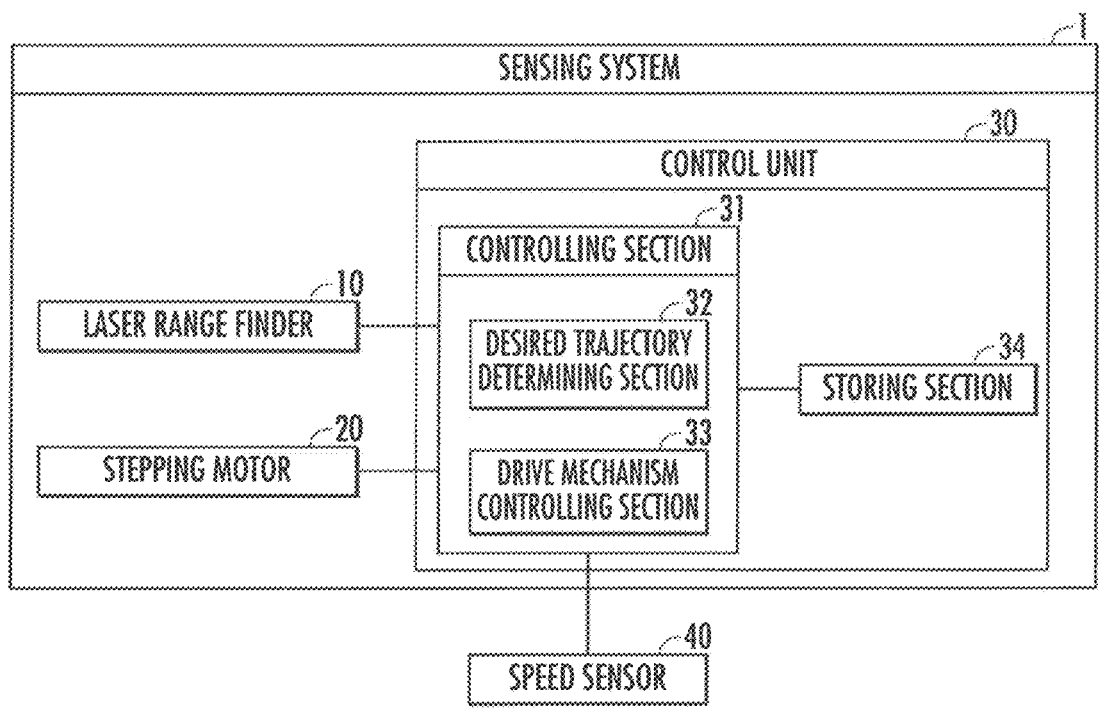
FIG. 2 is a block diagram of the sensing system.

The sensing system 1, as shown in FIG. 1, includes a laser range finder 10, serving as a sensor, a stepping motor 20, serving as a drive mechanism, and a control unit 30 (see FIG. 2).

As shown in FIG. 1, the laser range finder 10 is configured to repeatedly measure distances (corresponding to the "information about surrounding space" in the present invention) by emitting laser light at prescribed time intervals, as its reference axis Xc (corresponding to the "reference axis" in the present invention; this corresponds to the optical axis of the laser range finder 10), for example, swings about a yaw axis Z (corresponding to "an axis" in the present invention) of the robot in a range (movable angle range a) between a first angle 10a and a second angle 10b in a drive mechanism coordinate system while being driven by the stepping motor 20. The movable angle range a of the laser range finder 10 may be controlled by a signal from the control unit 30.

The laser range finder 10 only needs to rotate about one axis, which is not limited to the yaw axis Z, but may be a roll, pitch, or other axis. While the reference axis Xc and one axis Z are orthogonal to each other in the present embodiment, the reference axis Xc and the one axis Z may cross each other at an angle other than the right angle, or they may not cross each other, or they may be parallel to each other. What is necessary is that the reference axis Xc and the one axis Z are not coaxial with each other.

Further, in place of, or in addition to, the laser range finder 10, another sensor, such as an image sensor like a camera, may be used.

The stepping motor 20 is connected to the laser range finder 10. The stepping motor 20 is configured to drive the laser range finder 10 in accordance with a signal from the control unit 30, to cause the laser range finder 10 to rotate about the yaw axis Z of the robot. In place of, or in addition to, the stepping motor 20, another motor or other drive mechanism may cause the laser range finder 10 to rotate.

The control unit 30, as shown in FIG. 2, includes a controlling section 31 and a storing section 34.

The controlling section 31 is configured with a processor such as a centralized processing unit (CPU). The controlling section 31 reads and executes a prescribed program stored in the storing section 34, to function as a desired trajectory determining section 32 and a drive mechanism controlling section 33, which execute processing described later.

The controlling section 31 is configured to recognize the moving speed of the robot in accordance with an input from a speed sensor 40 mounted on the robot. The controlling section 31 is also configured to recognize measurement data in accordance with an input from the laser range finder 10 and store the same in the storing section 34. Further, the controlling section 31 is configured to output a driving signal indicating the angle of the laser range finder 10 to the stepping motor 20, thereby driving the stepping motor 20 to a designated angle. The controlling section 31 is also configured to recognize the angle of the laser range finder 10 in accordance with an input from the stepping motor 20.

The storing section 34, which is configured with a storage device such as a RAM, ROM, or HDD, is configured to record various kinds of information. The storing section 34 is configured such that data used in computations by the controlling section 31 can be stored therein and read therefrom.

Trajectory Determining Processing

Trajectory determining processing performed by the controlling section 31 (desired trajectory determining section 32 and drive mechanism controlling section 33) will now be described with reference to FIGS. 3 and 4A.

Figure 3:
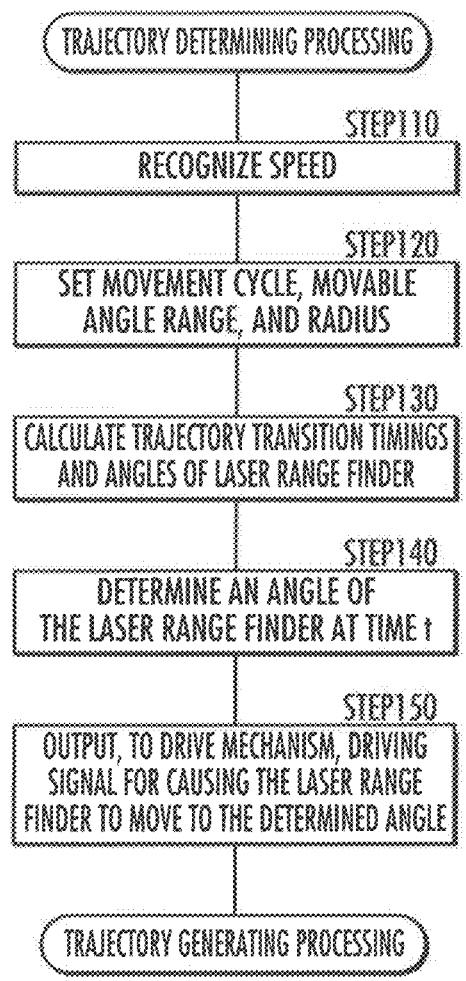
FIG. 3 is a flowchart of trajectory determining processing.

The desired trajectory determining section 32 recognizes the moving speed of the robot in accordance with an input from the speed sensor 40 (STEP 110 in FIG. 3).

The desired trajectory determining section 32 sets a movement cycle T of the laser range finder 10, a movable angle range a (in radian) of the laser range finder 10, and a radius r of a circle that is set as part of a trajectory of the laser range finder 10 (STEP 120 in FIG. 3).

The desired trajectory determining section 32 sets the movement cycle T of the laser range finder 10 so as to be an appropriate interval from the standpoint of maintaining favorable sensing accuracy. Alternatively, the desired trajectory determining section 32 may set the movement cycle T of the laser range finder 10 such that it becomes shorter continually or intermittently as the moving speed of the robot becomes higher.

Further, the desired trajectory determining section 32 sets the movable angle range a of the laser range finder 10 to a maximum value that is determined from mechanical constraint.

Alternatively, the desired trajectory determining section 32 may make the movable angle range a variable in accordance with the operation of the robot. In this case, at the time of making narrower or wider the movable angle range a of the laser range finder 10, the desired trajectory determining section 32 may set the traveling direction of the robot as the center of the movement range of the laser range finder 10, or may set a direction determined based on the surrounding environmental information measured by the laser range finder 10 as the center of the movement range of the laser range finder 10.

The desired trajectory determining section 32 sets the radius r of the circle to a smallest possible value within the range where the load acting on the stepping motor 20 will not exceed a prescribed load. In addition, the desired trajectory determining section 32 sets the radius r of the circle to a value not more than 0.5 times the movable angle range a of the laser range finder 10.

Alternatively, the desired trajectory determining section 32 may set some or all of the movement cycle T of the laser range finder 10, the movable angle range a of the laser range finder 10, and the radius r independently of the moving speed of the robot.

Figure 4A:
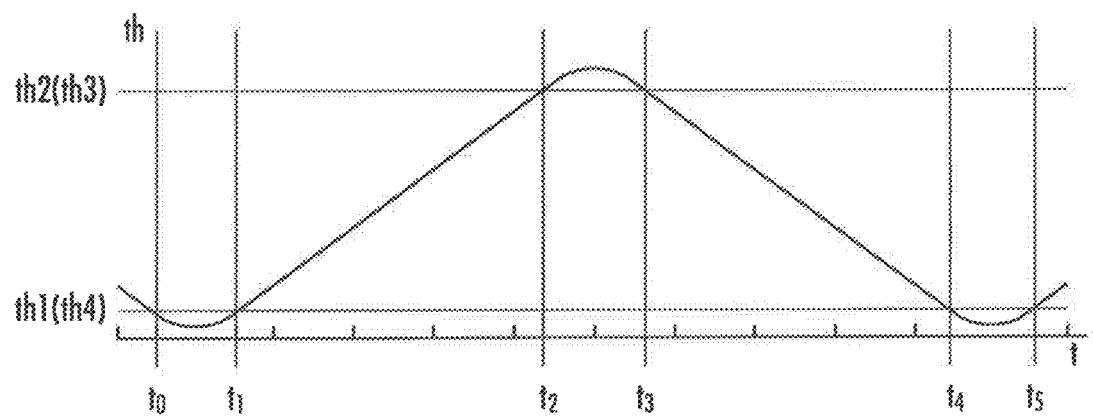

The desired trajectory determining section 32 calculates, using the following expressions (1) to (8), transition timings $t_1$ to $t_4$ in controlling expressions for a current-time cycle, as well as angles $th_1$ to $th_4$ of the laser range finder 10 at the respective timings, in a desired trajectory indicating a time series of angle of the laser range finder 10 shown in FIG. 4A (STEP 130 in FIG. 3).

$$t_1 = \frac{2r\left(2r\frac{T}{2} + (a-2r)\sqrt{\left(\frac{T}{2}\right)^2 + (a-2r)^2 - (2r)^2}\right)}{\left(\frac{T}{2}\right)^2 + (a-2r)^2} \quad (1)$$

$$th_1 = r + \frac{r\left(2r(a-2r) - \frac{T}{2}\sqrt{\left(\frac{T}{2}\right)^2 + (a-2r)^2 - (2r)^2}\right)}{\left(\frac{T}{2}\right)^2 + (a-2r)^2} \quad (2)$$

$$t_2 = \frac{T}{2} \quad (3)$$

$$th_2 = a - th_1 \quad (4)$$

$$t_3 = \frac{T}{2} + t1 \quad (5)$$

$$th_3 = th_2 \quad (6)$$

$$t_4 = T \quad (7)$$

$$th_4 = t_1 \quad (8)$$

In the case of changing the radius r, the movable angle range a, and the cycle T depending on the change in moving speed of the robot or other factor, $t_1$ to $t_4$ and $th_1$ to $th_4$ described above may be obtained using a new radius r, a new movable range angle a, and a new cycle T from a starting point of a next-time cycle. Alternatively, for example, the following expressions (9) to (12) may be used to obtain $t_5$, $t_6$, $th_5$, and $th_6$ shown in FIG. 4C and control may be performed as in the current-time cycle, and then, for a next-time cycle starting at $t_6$, a new radius r, a new movable range angle a, and a new cycle T may be used to obtain $t_7$, $t_8$ . . .

$$t_5 = T + t1 \quad (9)$$

$$th_5 = th_1 \quad (10)$$

$$t_6 = \frac{3}{2}T \quad (11)$$

$$th_6 = th_2 \quad (12)$$

The desired trajectory determining section 32 uses the following expression (13) to determine a desired trajectory th(t) (desired angle th(t) of the laser range finder 10 at time t) shown in FIG. 4A (STEP 140 in FIG. 3). It should be noted that $t_0 = 0$.

$$th(t) = \begin{cases} r - \sqrt{r^2 - t^2} & (\text{when } t_0 \le t < t_1) \\ r + \dfrac{t(r^2 - t_1)}{th_1} & (\text{when } t_1 \le t < t_2) \\ a - r + \sqrt{r^2 - \left(t - \dfrac{T}{2}\right)^2} & (\text{when } t_2 \le t < t_3) \\ r + th_3 + \dfrac{(t - t_3)(th_4 - th_3)}{t_4 - t_3} & (\text{when } t_3 \le t < t_4) \end{cases} \quad (13)$$

It should be noted that the period where $t_0 \le t \le t$ corresponds to the "first period in the current-time cycle" of the present invention, $t_1$ corresponds to the "end of the first period" of the present invention, the period where $t_1 < t < t_2$ corresponds to the "first intermediate period in the current-time cycle" of the present invention, $t_2$ corresponds to the "beginning of the second period" of the present invention, the period where $t_2 \le t \le t_3$ corresponds to the "second period in the current-time cycle" of the present invention, $t_3$ corresponds to the "end of the second period in the current-time cycle" of the present invention, the period where $t_3 < t < t_4$ corresponds to the "second intermediate period in the current-time cycle" of the present invention, and $t_4$ corresponds to the "beginning of the first period in a next-time cycle" of the present invention.

The drive mechanism controlling section 33 outputs to the drive mechanism (stepping motor) 20 a driving signal for causing the laser range finder 10 to move to, or causing the reference axis Xc of the laser range finder 10 to rotate to, the determined desired angle th(t) (STEP 150 in FIG. 3). The stepping motor 20 in turn causes the laser range finder 10 to rotate in accordance with the driving signal. This enables the laser range finder 10, and its reference axis Xc, to rotate to the desired angle th(t), and thus enables the laser range finder 10, and its reference axis Xc, to rotate in accordance with the desired trajectory th(t) shown in FIG. 4A.

Functions and Effects of the Embodiment

Figure 4B:
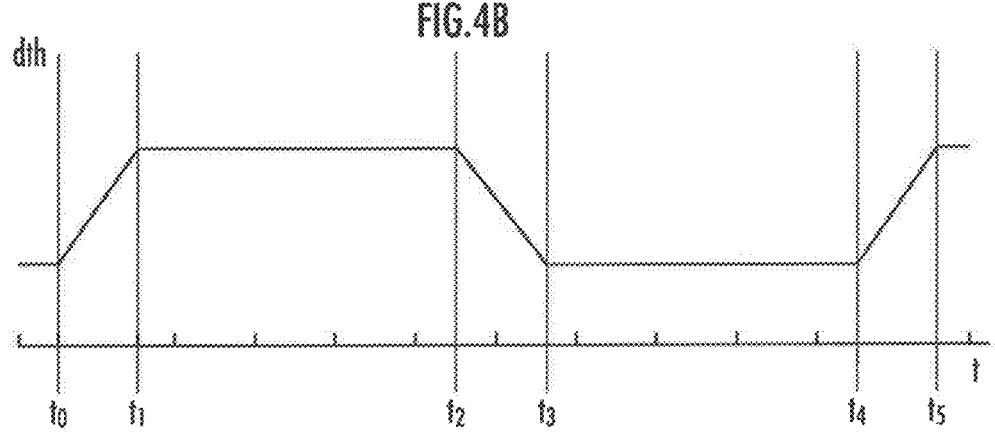
Figure 4C:
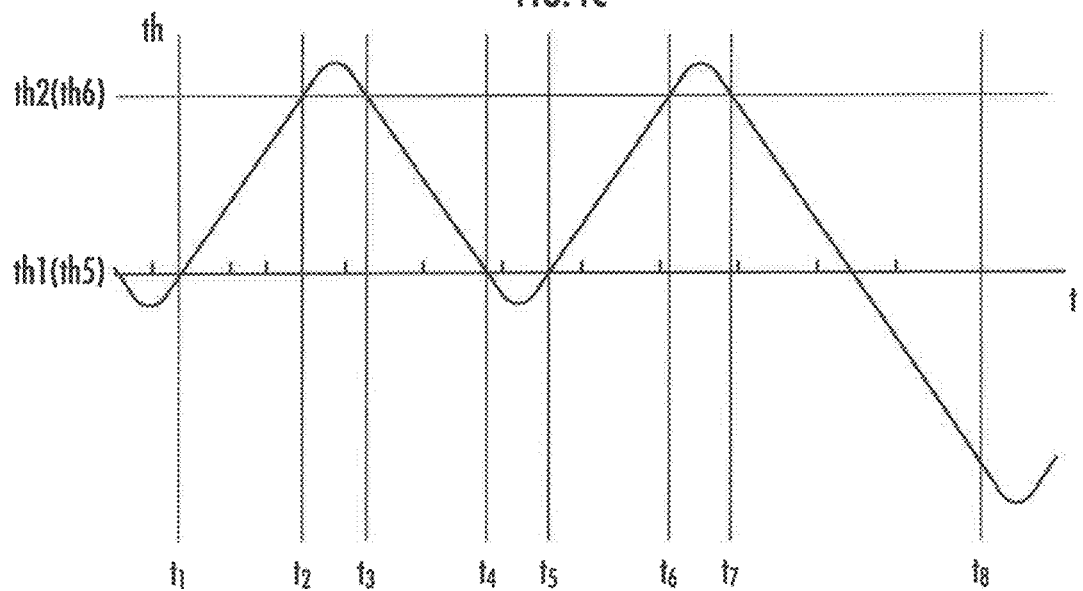

According to the sensing system 1 of the present embodiment, the desired trajectories th(t) in $t_0$ to $t_1$, $t_2$ to $t_3$, and $t_4$ to $t_5$ are each formed of part of a circle (see the above expression (13)). Thus, as shown in FIG. 4B, the moving angular velocity dth(t) of the laser range finder 10 becomes continuous in the respective periods $t_0$ to $t_1$, $t_2$ to $t_3$, and $t_4$ to $t_5$.

Further, the desired trajectories th(t) in $t_1$ to $t_2$ and $t_3$ to $t_4$ are each configured with a tangent line (see the expression (13)). Thus, as shown in FIG. 4B, the moving angular velocity dth(t) of the laser range finder 10 becomes constant in each of the periods $t_1$ to $t_2$ and $t_3$ to $t_4$ and at each of the transition timings $t_1$, $t_2$, $t_3$, and $t_4$. Accordingly, the moving angular velocity dth(t) of the laser range finder 10 does not become discontinuous (but is continuous) during a cycle $t_0$ to $t_4$. This can reduce or eliminate the load on the stepping motor 20.

FIG. 5 is a histogram of density of measurement data acquired by the laser range finder 10 in each interval in the case where the laser range finder is moved from 258° to 347° in the movable angle range 258° to 347°, which range is divided into 20 intervals. In FIG. 5, the bars with left-up and right-down slanted stripes show the histogram of the measurement data acquired when the laser range finder 10 was moved by the sensing system 1 of the present embodiment. The bars with right-up and left-down slanted stripes show the histogram of the measurement data acquired when a laser range finder was moved in accordance with a desired trajectory expressed by a trigonometric function. It should be noted that each value has been normalized.

According to the sensing system 1, the desired trajectories th(t) in the periods $t_1$ to $t_2$ and $t_3$ to $t_4$ are each configured with a tangent line, as explained above. The moving angular velocity dth(t) of the laser range finder 10 is thus constant in these periods $t_1$ to $t_2$ and $t_3$ to $t_4$ as shown in FIG. 4B. Here, the frequency of measurement by the laser range finder 10 is constant. Thus, as compared to the case where the laser range finder is moved in accordance with the desired trajectory expressed by the trigonometric function, the range having a constant measurement data acquisition density becomes as wide as from about 270 degrees to about 350 degrees, as shown by the bars with left-up and right-down slanted stripes in the histogram in FIG. 5.

As a result, according to the sensing system 1, it is possible to reduce or eliminate the load on the stepping motor 20 that rotationally moves the laser range finder 10, while keeping the measurement data acquisition density constant in at least some periods (periods $t_1$ to $t_2$ and $t_3$ to $t_4$).

Further, the present inventors have found through studies that, in the case where the desired trajectories th(t) in $t_0$ to $t_1$, $t_2$ to $t_3$, and $t_4$ to $t_5$ are each expressed by part of a circle having a prescribed radius r and the radius r is not larger than 0.5 times the radian value of the movable angle range a, then the absolute value of the moving angular velocity dth(t) of the laser range finder 10 can be kept small as compared to the case where a laser range finder is moved in accordance with a desired trajectory expressed by a trigonometric function with the same angle range and with the same cycle.

More specifically, the moving angular velocity dth(t) of the laser range finder 10 in the period $t_1$ to $t_2$ is expressed by the following expression (21).

$$dth(t) = \frac{th(t_2) - th(t_1)}{t_2 - t_1} = \frac{a - 2th(t_1)}{\frac{T}{2} - t_1} \qquad (21)$$

Here, $t_1$ and $th_1$ are expressed by the above expressions (1) and (2), so dth(t) is expressed by the following expression (22).

$$dth(t) = \frac{\left(\left(\frac{T}{2}\right)^2 + (a-2r)^2\right)(a-2r) - 4r^2(a-2r) - rT\sqrt{\left(\frac{T}{2}\right)^2 + (a-2r)^2 - (2r)^2}}{\left(\left(\frac{T}{2}\right)^2 + (a-2r)^2\right)\left(\frac{T}{2}\right) - 2r^2T - 2r(a-2r)\sqrt{\left(\frac{T}{2}\right)^2 + (a-2r)^2 - (2r)^2}} \qquad (22)$$

On the other hand, a trajectory having the same cycle T, the same movable angle range a, and a peak is expressed using a trigonometric function by the following expression (23).

$$f_{cos}(t) = \frac{-a}{2}\cos(\omega t) + \frac{a}{2} \qquad (23)$$

where $\omega = \frac{2\pi}{T}$

Its speed is expressed by the following expression (24).

$$df_{cos}(t) = \frac{-a\omega}{2}\sin(\omega t) = \frac{\pi a}{T}\sin(\omega t) \qquad (24)$$

This speed attains a maximum value when $\omega t = \pi/2$. The maximum value is thus expressed by the following expression (25).

$$\max\ df_{cos}(t) = \frac{\pi a}{T} \qquad (25)$$

When it is assumed in the expression (22) that a=2r for simplification of the expression, then dth(t) is expressed by the following expression (26).

$$dth(t) \cong \frac{-rT\sqrt{\left(\frac{T}{2}\right)^2 - 4r^2}}{\left(\frac{T}{2}\right)^3 - 2r^2T} \qquad (26)$$

The condition of placing a circle yields the following: T>2a=4r.

Here, considering a condition that dth(t) does not exceed $df_{cos}(t)$, the following expression (27) should hold.

$$-rT\sqrt{\left(\frac{T}{2}\right)^2 - 4r^2} < \pi a\left\{\left(\frac{T}{2}\right)^3 - 2r^2T\right\} \qquad (27)$$

Here, T>4r, so the following expressions (28) and (29) hold.

$$\left(\frac{T}{2}\right)^2 - 4r^2 > 0 \qquad (28)$$

$$\left(\frac{T}{2}\right)^3 - 2r^2T > 0 \qquad (29)$$

Accordingly, the expression (27) always holds when a=2r.

As dth(t|2r=a)>dth(t|2r<a), the moving angular velocity dth(t) of the laser range finder 10 does not exceed $df_{cos}(t)$ when 2r≤a.

The sensing system 1, configured in view of the foregoing, can keep the absolute value of the moving angular velocity dth(t) of the laser range finder 10 small. This can reduce or eliminate the load on the stepping motor 20, and can further increase the measurement data acquisition density.

The above will now be described more specifically with reference to FIGS. 6A to 7B.

Figure 6A:
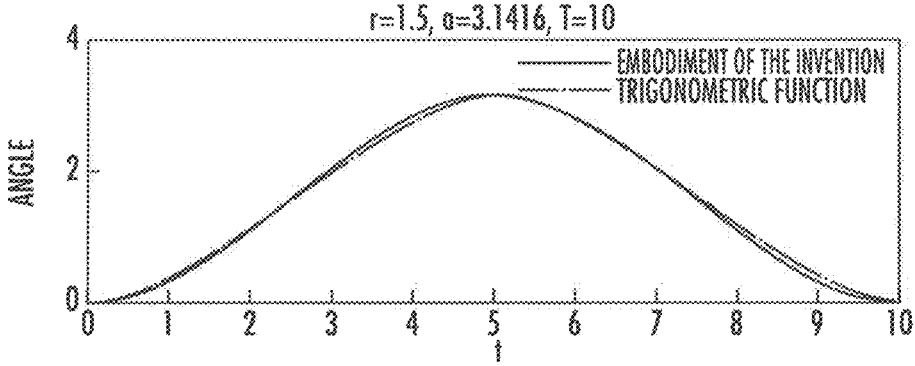

FIG. 6A is a graph with the vertical axis representing the angle of the laser range finder 10 and the horizontal axis representing elapsed time t.

Figure 6B:
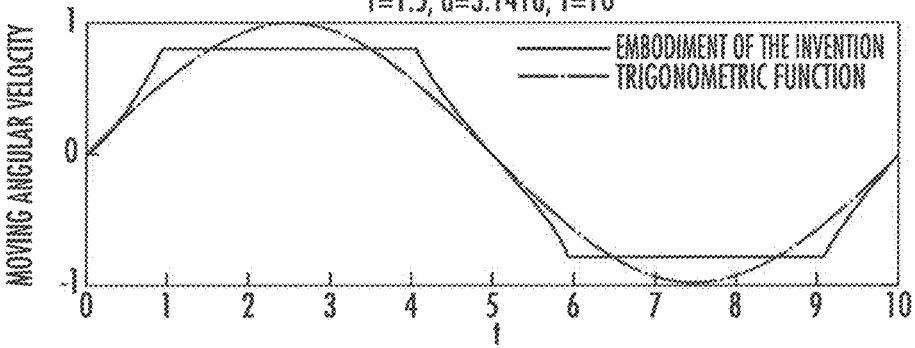

FIG. 6B is a graph with the vertical axis representing the moving angular velocity of the laser range finder 10 and the horizontal axis representing the elapsed time t corresponding to the time series of angle of the laser range finder 10 in FIG. 6A.

In these graphs, the solid line graphs represent a time series of angle th(t) and its moving angular velocity dth(t) of the laser range finder 10 in the sensing system 1 in the case where the radius r is set to 1.5, the movable angle range a to 3.1416 (rad), and the cycle T to 10 (unit time). The dash-dot line graphs represent a time series of angle f(t) and its moving angular velocity df(t) of a laser range finder in the case where the laser range finder is moved in accordance with a desired trajectory of a trigonometric function expressed by the expression (23).

As seen from the graph in FIG. 6B, the moving angular velocity dth(t) of the laser range finder 10 in the sensing system 1 takes a maximum value that is smaller than the maximum value of the moving angular velocity df(t) of the laser range finder in the case where the laser range finder is moved in accordance with the desired trajectory of the trigonometric function expressed by the expression (23).

Figure 6C:
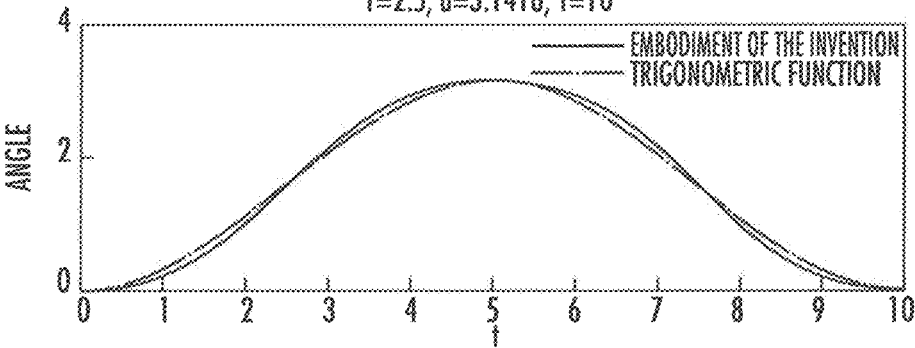
Figure 6D:
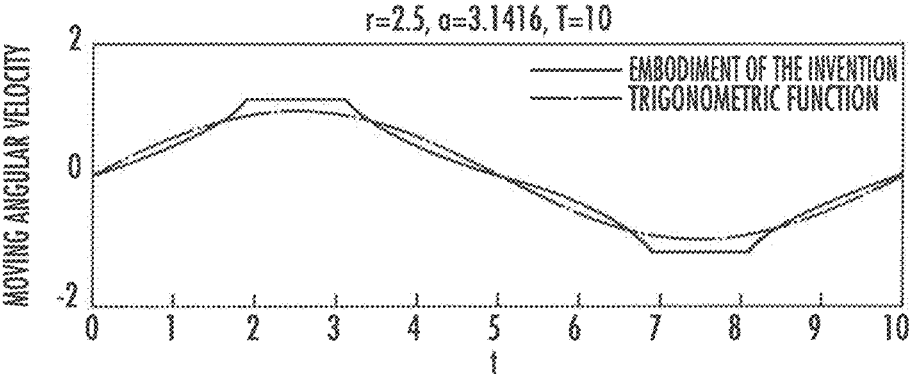

Further, FIG. 6C is a graph, similar to that in FIG. 6A, with the vertical axis representing the angle of the laser range finder 10 and the horizontal axis representing elapsed time t. FIG. 6D is a graph, similar to that in FIG. 6B, with the vertical axis representing the moving angular velocity of the laser range finder 10 and the horizontal axis representing the elapsed time t corresponding to the time series of angle of the laser range finder 10 in FIG. 6C.

FIGS. 6C and 6D differ from FIGS. 6A and 6B in that the solid line graphs represent a time series of angle th(t) and its moving angular velocity dth(t) of the laser range finder 10 in the case where the laser range finder 10 is shifted according to the aforesaid trajectory determining processing in which the radius r is set to 2.5, the movable angle range a to 3.1416 (rad), and the cycle T to 10 (unit time).

As seen from the graph in FIG. 6D, the moving angular velocity dth(t) of the laser range finder 10 takes a maximum value that is larger than the maximum value of the moving angular velocity df(t) of the laser range finder in the case where the laser range finder is moved in accordance with the desired trajectory of the trigonometric function expressed by the expression (23).

Figure 7A:
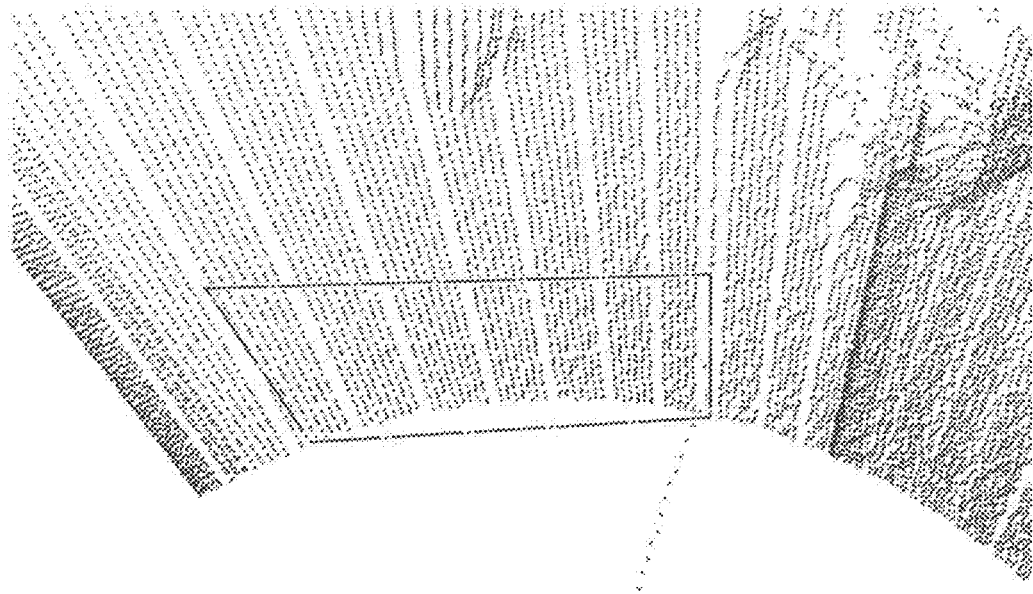
Figure 7B:
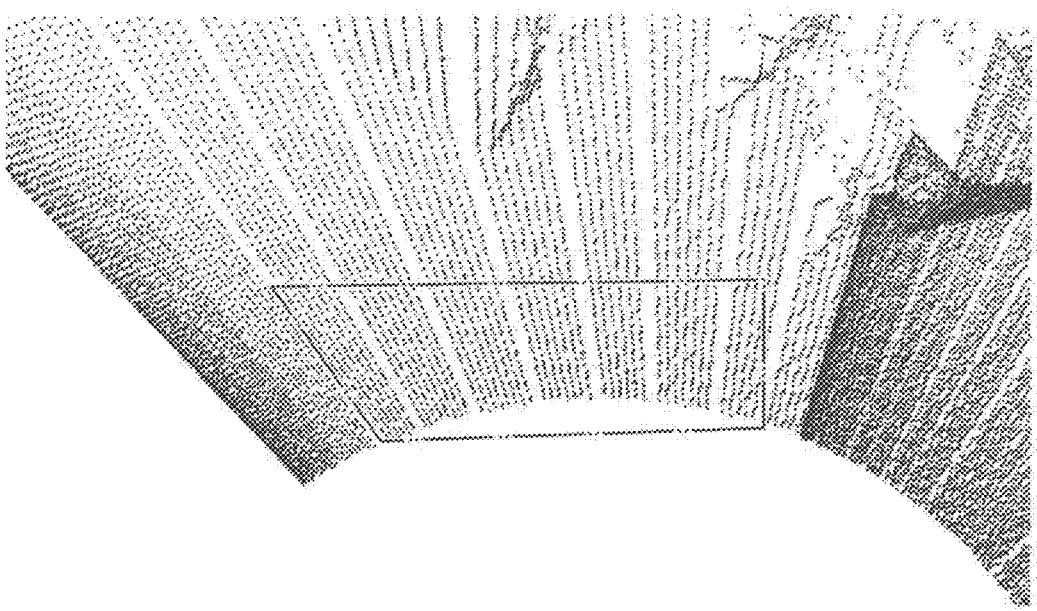
Figure 8A:
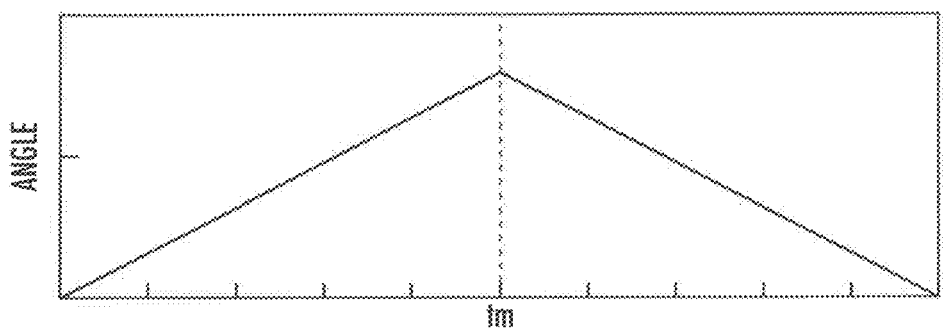
Figure 8B:
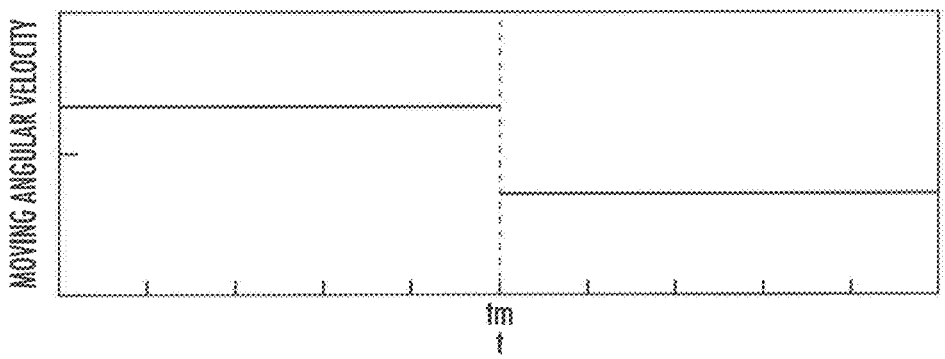
Figure 8C:
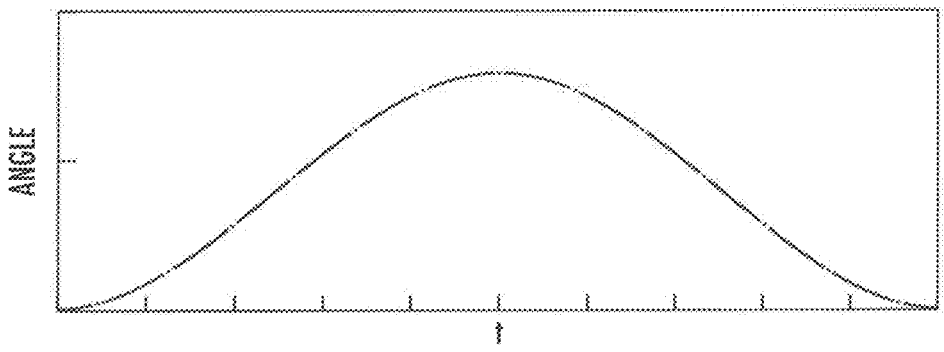
Figure 8D:
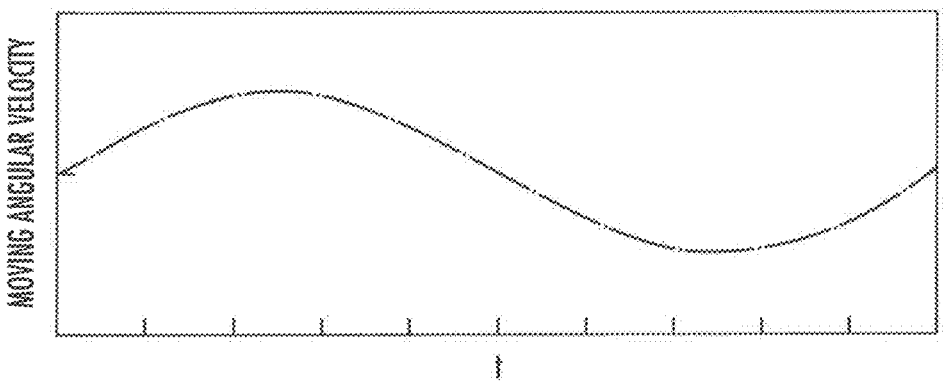

FIG. 7A schematically shows traces of laser irradiation by the sensing system 1. FIG. 7B schematically shows traces of laser irradiation in the case where the laser range finder 10 is moved in accordance with the desired trajectory of the trigonometric function expressed by the expression (23).

As indicated by a portion delimited by the dash-dot line in FIG. 7A, the density of measurement data acquired in the sensing system 1 is approximately constant and is also high at and near the center of the movable angle range. The measurement data density being constant and being high indicates that the measurement ranges S are distributed at appropriate intervals at and near the center of the movable angle range, as shown in FIG. 1.

In contrast, as indicated by a portion delimited by the dash-dot-dot line in FIG. 7B, the density of the measurement data is not constant and is low in the case where the laser range finder is moved in accordance with the desired trajectory of the trigonometric function expressed by the expression (23).

Further, in the sensing system 1 in FIGS. 6A and 6B, the radius r has been set to be not more than 0.5 times the movable angle range a. This makes it possible to keep small the absolute value of the moving angular velocity dth(t) of the laser range finder 10, as shown in FIG. 6B. This results in reduction or elimination of the load on the stepping motor 20, and also an increased sensor data acquisition density, as shown in FIG. 7A.

Modification

In the present embodiment, the desired trajectories th(t) in the periods $t_0$ to $t_1$, $t_2$ to $t_3$, and $t_4$ to $t_5$ are each formed of part of a circle having a prescribed radius r. The desired trajectories th(t) in the periods $t_0$ to $t_1$, $t_2$ to $t_3$, and $t_4$ to $t_5$, however, are not limited thereto; all that is needed is that the desired trajectory th(t) in each of these periods is a function whose first derivative with respect to time is continuous in that period.

What is claimed is:

1. A sensing system comprising:
  a sensor configured to acquire information about surrounding space at a certain time interval;
  a drive mechanism which causes a reference axis of the sensor to swing about an axis in a range not smaller than a first angle and not larger than a second angle in a drive mechanism coordinate system;
  a desired trajectory determining section which is operable, in a case where a current-time cycle for the reference axis of the sensor to make one swing is divided into a first period, including a time point at which an angle of the reference axis of the sensor becomes the first angle, the time point not falling on a beginning or an end of the first period, a second period, including a time point at which an angle of the reference axis of the sensor becomes the second angle, the time point not falling on a beginning or an end of the second period, a first intermediate period, being a period between the first period and the second period, and a second intermediate period, being a period between the second period and a first period in a next-time cycle, to determine
    a first desired trajectory representing a time series of angle of the reference axis of the sensor in the first period in the current-time cycle, a first derivative with respect to time of the first desired trajectory being continuous in the first period in the current-time cycle,
    a second desired trajectory representing a time series of angle of the reference axis of the sensor in the second period in the current-time cycle, a first derivative with respect to time of the second desired trajectory being continuous in the second period in the current-time cycle, an inclination of a tangent line to the second desired trajectory at a beginning of the second period in the current-time cycle being identical to an inclination of a tangent line to the first desired trajectory at an end of the first period in the current-time cycle, an inclination of a tangent line to the second desired trajectory at an end of the second period in the current-time cycle being identical to an inclination of a tangent line to the first desired trajectory at a beginning of the first period in the next-time cycle,
    a third desired trajectory representing a time series of angle of the reference axis of the sensor in the first intermediate period in the current-time cycle, the third desired trajectory being configured with the tangent line to the first desired trajectory at the end of the first period in the current-time cycle, and
    a fourth desired trajectory representing a time series of angle of the reference axis of the sensor in the second intermediate period in the current-time cycle, the fourth desired trajectory being configured with the tangent line to the second desired trajectory at the end of the second period in the current-time cycle; and
  a drive mechanism controlling section which controls an operation of the drive mechanism so as to track each of the desired trajectories determined by the desired trajectory determining section.

2. The sensing system according to claim 1, wherein the first desired trajectory is twice differentiable with respect to time at and around the time point at which the angle of the reference axis of the sensor becomes the first angle, and the second desired trajectory is twice differentiable with respect to time at and around the time point at which the angle of the reference axis of the sensor becomes the second angle.

3. The sensing system according to claim 2, wherein at least one of the first desired trajectory and the second desired trajectory is a trajectory expressed by a circle.

4. A sensing method performed by a system which includes a sensor configured to acquire information about surrounding space at a certain time interval and a drive mechanism causing a reference axis of the sensor to swing about an axis in a range not smaller than a first angle and not larger than a second angle in a drive mechanism coordinate system, the method comprising:
  a desired trajectory determining step of, in a case where a current-time cycle for the reference axis of the sensor to make one swing is divided into a first period, including a time point at which an angle of the reference axis of the sensor becomes the first angle, the time point not falling on a beginning or an end of the first period, a second period, including a time point at which an angle of the reference axis of the sensor becomes the second angle, the time point not falling on a beginning or an end of the second period, a first intermediate period, being a period between the first period and the second period, and a second intermediate period, being a period between the second period and a first period in a next-time cycle, determining a first desired trajectory representing a time series of angle of the reference axis of the sensor in the first period in the current-time cycle, a first derivative with respect to time of the first desired trajectory being continuous in the first period in the current-time cycle, a second desired trajectory representing a time series of angle of the reference axis of the sensor in the second period in the current-time cycle, a first derivative with respect to time of the second desired trajectory being continuous in the second period in the current-time cycle, an inclination of a tangent line to the second desired trajectory at a beginning of the second period in the current-time cycle being identical to an inclination of a tangent line to the first desired trajectory at an end of the first period in the current-time cycle, an inclination of a tangent line to the second desired trajectory at an end of the second period in the current-time cycle being identical to an inclination of a tangent line to the first desired trajectory at a beginning of the first period in the next-time cycle, a third desired trajectory representing a time series of angle of the reference axis of the sensor in the first intermediate period in the current-time cycle, the third desired trajectory being configured with the tangent line to the first desired trajectory at the end of the first period in the current-time cycle, and a fourth desired trajectory representing a time series of angle of the reference axis of the sensor in the second intermediate period in the current-time cycle, the fourth desired trajectory being configured with the tangent line to the second desired trajectory at the end of the second period in the current-time cycle; and a drive mechanism controlling step of controlling an operation of the drive mechanism so as to track each of the desired trajectories determined in the desired trajectory determining step.

* * * * *